United States Patent Office 3,833,663
Patented Sept. 3, 1974

3,833,663
OXIDATION OF HYDROCARBONS
James McAvoy, Norton-on-Tees, England, assignor to Imperial Chemical Industries Limited, London, England
Filed Dec. 16, 1968, Ser. No. 784,198
Claims priority, application Great Britain, Jan. 5, 1968, 860/68
Int. Cl. C07c 73/08
U.S. Cl. 260—610 B  4 Claims

ABSTRACT OF THE DISCLOSURE

Hydrocarbon hydroperoxides are produced by oxidising a hydrocarbon having at least one secondary or tertiary carbon atom, for example cumene, in the liquid phase with a gas containing free oxygen in the presence of a fluoride of an alkali or alkaline earth metal, particularly sodium fluoride.

---

This invention relates to the oxidation of hydrocarbons.

It is known to oxidise hydrocarbons with a gas containing free oxygen and to accelerate the rate of oxidation by the use of catalyst. However, it is frequently found that acceleration of the rate of oxidation leads to increased production of unwanted by-products. For example, in the oxidation of cumene to cumene hydroperoxide the presence of sodium hydroxide or the sodium salt of cumene hydroperoxide accelerates the rate of oxidation but also increases the formation of unwanted by-products such as phenyl dimethyl carbinol and acetophenone.

We have now found that the rate of production of unwanted by-products can be reduced by carrying out the oxidation in the presence of an alkali or alkaline earth metal fluoride. Furthermore, this very desirable effect can be achieved at rates of oxidation at least as good as those obtained with the known catalysts.

Thus, according to the invention there is provided a process for the oxidation of hydrocarbons to hydroperoxides in which a hydrocarbon having at least one secondary or tertiary carbon atom is contacted in the liquid phase with a gas containing free oxygen in the presence of a fluoride of an alkali or alkaline earth metal.

The hydrocarbon having at least one secondary or tertiary carbon atom may be branched or unbranched aliphatic hydrocarbon, an alicyclic hydrocarbon such as cyclohexane or cyclo-octane or an aralkyl hydrocarbon such as ethyl benzene, cumene or di-isopropyl benzene. Mixtures of hydrocarbons, for example, mixtures of saturated aliphatic hydrocarbons having from 5 to 9 carbon atoms may be oxidised by the process of the invention. It is particularly applicable to the oxidation of cumene to cumene hydroperoxide.

The fluoride may be suspended in the reaction mixture or it may be added to the reaction mixture in the form of a solution or suspension in a liquid such as water. It is preferred that the concentration of fluoride is in the range 0.01 to 0.2% by weight of the hydrocarbon. Examples of suitable fluorides are sodium, potassium, calcium, barium and strontium fluorides. It is preferred to use sodium fluoride.

Although it is not essential, some hydroperoxide may usefully be present in the reaction mixture before the oxidation reaction is started.

The hydrocarbon should be oxidised in the liquid phase which may be provided by the hydrocarbon to be oxidised and/or by an inert solvent such as a hydrocarbon.

The pressure under which the oxidation is conducted may be atmospheric or elevated pressure and should be at least such as to maintain a liquid phase.

The temperature employed depends on the particular hydrocarbon to be oxidised. Temperatures in the range 40° to 140° C. are usually suitable. In the oxidation of cumene it is preferred that the temperature is in the range 110° to 130° C.

The gas containing free oxygen may be oxygen or oxygen diluted with a gas which is inert under the reaction conditions, for example, air.

The invention is illustrated by the following Examples. In each Example 176 g. cumene were placed in a glass reaction vessel fitted with a cruciform stirrer and connected to a pump so that gas in the reaction vessel could be continuously withdrawn and recycled via the stirrer through the cumene. The air in the vessel was then displaced by nitrogen and the cumene heated to the chosen reaction temperature. The nitrogen was next displaced by oxygen, an amount of a 50% solution of cumene hydroperoxide in cumene introduced into the reaction vessel and oxygen continuously passed through the reaction mixture for a known period of time. Oxygen adsorption was measured by means of a gas burette, cumene hydroperoxide determined by an iodometric method and dimethyl phenyl carbinol and acetophenone determined by infrared spectrography. The effective pH was measured in an aqueous solution obtained by shaking one volume of the reaction product with 2 volumes of distilled water.

In the Examples CHP designates cumene hydroperoxide, PDMC phenyl dimethyl carbinol and ACP acetophenone.

EXAMPLE 1

The reaction conditions used and results obtained in a series of experiments designed to show the effect of catalyst concentration and temperature in the oxidation of cumene are given in the following table. In Experiment No. 1 the catalyst was caustic soda and in all the other experiments the catalyst was sodium fluoride. In all the experiments an amount of water was added with the catalyst which corresponds to 0.5 per cent by weight of the cumene.

| Experiment number | 1 | 2 | 3 | 4 | 5 | 6 |
|---|---|---|---|---|---|---|
| Percent w./w. catalyst | 0.035 | 0.036 | 0.036 | 0.036 | 0.01 | 0.1 |
| Temperature, ° C | 115 | 100 | 115 | 120 | 115 | 1M |
| Reaction time (hours) | 3.25 | 5.5 | 4.8 | 2.75 | 4.0 | 3.5 |
| Effective pH | 6.0 | 4.6 | 4.1 | 3.9 | 3.7 | 4.2 |
| Initial concentration CHP percent w./w. | 5.1 | 5.6 | 7.3 | 6.2 | 6.7 | 7.9 |
| Percent by wt. CHP produced per hour | 7.7 | 2.3 | 5.9 | 9.4 | 5.8 | 6.2 |
| Percent by wt. PDMC produced per hour | 1.0 | 0.16 | 0.5 | 0.8 | 0.5 | 0.4 |
| Percent by wt. ACP produced per hour | 0.15 | 0.01 | 0.06 | 0.12 | 0.06 | 0.07 |
| Mole ratio CHP: PDMC | 6.9 | 12.7 | 13.2 | 10.6 | 13.3 | 16.0 |
| Moles percent CHP per hour × 10³ | 51 | 15 | 39 | 62 | 38 | 41 |

Comparison of the results of experiments Nos. 1, 3, and 4 shows that sodium fluoride is a better catalyst than caustic soda since it gives a much better CHP to PDMC ratio even at a higher reaction rate. Comparison of the results of experiments Nos. 2, 3 and 4 shows the increase in reaction rate with increase in temperature while comparison of experiments Nos. 3, 5 and 6 shows the effect of sodium fluoride concentration.

EXAMPLE 2

The following table gives the reaction conditions used and the results obtained in experiments designed to demonstrate the suitability of other catalysts falling within the scope of the invention. In experiment No. 7 the catalyst was solid calcium fluoride which was introduced into the reaction mixture together with an amount of water corresponding to 0.5 per cent by weight on the cumene. In experiment No. 8 the catalyst was solid potassium fluoride dihydrate and no additional water was added. In experiment No. 9 the catalyst was potassium fluoride which was introduced into the reaction mixture together with an amount of water corresponding to 1.0 per cent by weight on the cumene.

| Experiment number | 7 | 8 | 9 |
|---|---|---|---|
| Percent w./w. catalyst | 0.1 | 0.08 | 0.05 |
| Temperature, °C | 115 | 115 | 115 |
| Reaction time (hours) | 4.0 | 3.5 | 4.0 |
| Effective pH | 3.9 | 4.1 | 6.5 |
| Initial concentration CHP percent w./w. | 7.1 | 6.4 | 6.3 |
| Percent by wt. CHP produced per hour | 6.5 | 8.1 | 6.5 |
| Percent by wt. PDMC produced per hour | 0.57 | 0.8 | 0.65 |
| Percent by wt. ACP produced per hour | 0.08 | 0.09 | 0.08 |
| Mole ratio CHP: PDMC | 10.1 | 11.2 | 11.2 |
| Moles percent CHP per hour $\times 10^3$ | 43 | 53 | 43 |

EXAMPLE 3

The following table gives the reaction conditions used and the results obtained in a series of experiments which show that sodium fluoride gives a better yield of CHP together with decreased formation of PDMC and ACP compared with the sodium salt of cumene hydroperoxide. In each experiment the reaction temperature was 115° C., the reaction time was 5.5 hours and 24 g. of a 50% solution of CHP in cumene was introduced into the reaction vessel before the passage of oxygen was commenced. In experiment No. 10 no catalyst was employed while in experiments Nos. 11 and 12 respectively, 0.3 g. of the sodium salt of CHP dissolved in 2 ml. distilled water or 0.073 g. sodium fluoride together with 1 ml. distilled water were added with the solution of CHP in cumene.

| Experiment | pH | $O_2$ absorbed* | CHP produced* | Percent by weight in product of— | | |
|---|---|---|---|---|---|---|
| | | | | CHP | PDMC | ACP |
| 10 | 3.7 | 0.364 | 0.314 | 26.2 | 2.1 | 0.21 |
| 11 | 5.4 | 0.389 | 0.343 | 28.7 | 4.6 | 0.42 |
| 12 | 3.7 | 0.401 | 0.353 | 29.7 | 2.3 | 0.27 |

*In moles/kg. cumene/hr.

I claim:

1. A process for the oxidation of cumene to cumene hydroperoxide in which cumene is contacted in the liquid phase and in the presence of cumene hydroperoxide at a temperature in the range 40° to 140° C. with a gas containing free-oxygen in the presence of a fluoride of an alkali or alkaline earth metal.

2. A process as claimed in Claim 1 in which the fluoride is sodium fluoride.

3. A process as claimed in Claim 1 in which the fluoride is added to the reaction mixture as a solution or suspension in water.

4. A process as claimed in Claim 1 in which the pressure is at least sufficient to maintain the liquid phase.

References Cited

UNITED STATES PATENTS

| 3,539,645 | 11/1970 | Mead et al. | 260—610 B |
| 2,776,999 | 1/1957 | Joris | 260—610 B |

FOREIGN PATENTS

| 11,819 | 5/1967 | Japan | 260—610 B |

BERNARD HELFIN, Primary Examiner

W. B. LONE, Assistant Examiner